US005870130A

United States Patent [19]

Bae

[11] Patent Number: 5,870,130

[45] Date of Patent: Feb. 9, 1999

[54] METHOD FOR HEATING A THERMAL PRINTER HEAD APPARATUS THAT MINIMIZES CHANGES IN TEMPERATURE AND VOLTAGE, AND A THERMAL PRINTER HEAD HEATING CONTROL APPARATUS THEREFOR

[75] Inventor: Kwang-seog Bae, Suwon, Rep. of Korea

[73] Assignee: Samsung Electronics Co., Ltd., Kyungki-do, Rep. of Korea

[21] Appl. No.: 581,373

[22] Filed: Dec. 29, 1995

[51] Int. Cl.[6] .......................... B41J 2/355; G01D 15/10; G01D 15/16

[52] U.S. Cl. .......................................................... 347/183

[58] Field of Search .................................. 347/183, 211, 347/209; 358/296, 298, 503; 400/120.07

*Primary Examiner*—N. Le

*Assistant Examiner*—L. Anderson

*Attorney, Agent, or Firm*—Sughrue, Mion, Zinn, Macpeak & Seas, PLLC

[57] ABSTRACT

A thermal printer head (TPH) heating method for minimizing the change of temperature and voltage of the TPH and an apparatus adopting the same, including the steps of: generating successive gradation values which oscillate between the minimum and the maximum gradation values and converges on a medium value M; comparing the gradation value generated in the gradation value generating step with the pixel value; and providing the result of the comparing step to the TPH. Therefore, the heat accumulation phenomenon is reduced by uniformly distributing the heat amount of the TPH over the time and space axes so that the TPH function is improved.

18 Claims, 10 Drawing Sheets

METHOD FOR HEATING A THERMAL PRINTER HEAD APPARATUS THAT MINIMIZES CHANGES IN TEMPERATURE AND VOLTAGE, AND A THERMAL PRINTER HEAD HEATING CONTROL APPARATUS THEREFOR

BACKGROUND OF THE INVENTION

The present invention relates to a printer using a thermal printer head, and more particularly, to a heating method for minimizing changes of temperature and voltage of the thermal printer head and a heat control apparatus adopting the same.

The thermal printer head (TPH), which is a core of a thermal transfer type printer, consists of a plurality of heating elements and generates heat corresponding to gradation of a pixel to be printed. The generated heat is transferred to a thermosensitive recording sheet which runs in contact with TPH so that an image is printed.

TPH has heating and non-heating states corresponding to binary data of “0” and “1”. To represent various gradations with TPH, TPH must be repeatedly actuated as many as the value of the gradation required.

For instance, when a gradation value of a pixel is “55,” the heating element of TPH must be repeatedly heated 55 times with respect to the pixel.

FIG. 1 shows a conventional TPH heating controlling apparatus. In the drawing, a reference numeral 10 denotes an address generator; a reference numeral 12 denotes a line memory; a reference numeral 14 denotes a gradation generator; a reference numeral 16 denotes a comparator; and a reference numeral 18 denotes a line buffer.

Line memory 12 is for storing “n” units of m-bit data, and one vertical line of the image data is stored therein. Here, the one vertical line of the image data means a group of pixels corresponding to an arbitrary one vertical line among groups of pixels (vertical lines) arrayed in a column direction, when a frame image is digitally converted and arrayed in a matrix form.

Since the pixel data stored in line memory 12 is m-bit, the pixel data can have gradation values of 0 through $2^m-1$.

Gradation generator 14 is for successively generating each gradation value from 1 through $2^m-1$. The gradation value generated from gradation generator 14 is successively compared with the one vertical line of the data stored in line memory 12.

Address generator 10 for generating an address which designates a pixel read out from line memory 12 successively generates addresses from the lowermost address to the uppermost address. Also, address generator 10 actuates gradation generator 14 to shift the gradation value.

Comparator 16 is for comparing the gradation value generated from gradation generator 14 with the pixel data read out from line memory 12 and outputting “1” when the pixel data is greater than the gradation value and “0” in the reverse.

Line buffer 18 is for storing the compared result of comparator 16 by pixel. The contents stored in line buffer 18 are used for actuating TPH.

FIG. 2 shows a flowchart for explaining a method of printing the one vertical line by using the apparatus shown in FIG. 1.

First, in step 200, a gradation value generated from gradation generator 14 is renewed. The renewed gradation value is a consecutively increased value, relative to the previous gradation value.

In step 202, the pixel data stored in line memory 12 is read out from the uppermost pixel to the lowermost pixel. For this reading, address generator 10 generates addresses successively increasing from the uppermost address for designating the uppermost pixel down to the lowermost address for designating the lowermost pixel.

In step 204, the gradation value generated from gradation generator 14 is compared with the read out pixel value through comparator 16.

In step 206, the comparison result of step 204 is stored in line buffer 18.

In step 208, after all the pixel data of line memory 12 is read out and the gradation comparison completed, address generator 10 sends a gradation shift strobe signal for requiring a gradation shift to gradation generator 14. TPH is heated according to the comparison result stored in line buffer 18, to print one vertical line of the pixel data.

In step 210, it is judged whether all the gradation values have been generated in gradation generator 14. If all the gradation values are not generated, the operation returns to step 200. The completion of generating the all gradation values in gradation generator 14 means that printing for one vertical line is over.

Through the heating process described in FIG. 2, printing of one vertical line is performed. When the printing of the one vertical line is completed, the next vertical line data is stored in line memory 12. By repeating such a process with respect to all the other vertical lines, the printing of one frame image is accordingly performed.

Here, it is taken as an example that the gradation value generated from gradation generator 14 is generated in an order of 1, 2, 3, . . . , and $(2^m-1)$. However, there is another method for generating the gradation value by separating the same into odd numbers and even numbers, that is, 1, 3, 5, . . . , and $(2^m-1)$, and 2, 4, 6, . . . , and $(2^m-2)$.

FIGS. 3A and 3B show distribution of heat amount of TPH with respect to a time axis in the apparatus shown in FIG. 1. In FIG. 3A, the gradation value is in an order of 1, 2, 3, . . . , and $(2^m-1)$, and in FIG. 3B, the gradation value is in an order of 1, 3, 5, . . . , and $(2^m-1)$, and 2, 4, 6, . . . , and $(2^m-2)$.

In the apparatus shown in FIG. 1, the gradation value is successively shifted, and thus, the heat is intensified around a low gradation portion with respect to the time axis.

As shown in FIGS. 3A and 3B, since the heat is relatively great in the low gradation portion, a heat accumulation phenomenon becomes serious while the gradation value generated in gradation generator 14 is respectively lower. Thus, since the temperature of TPH rises, the TPH function is totally deteriorated.

Further, since most heating elements of TPH become a heating state in the low gradation, a TPH driving voltage applied to each heating element in common is lowered, affecting the heat amount of TPH.

SUMMARY OF THE INVENTION

To solve the above problems, it is an object of the present invention to provide a TPH heating method, by which a heat amount of TPH can be uniformly distributed with respect to a spatial axis and a temporal axis.

It is another object of the present invention to provide a heating control apparatus befitting to the TPH heating method.

Accordingly, to achieve the first object, there is provided a TPH heating method comprising the steps of: generating a gradation value which oscillates between the minimum and the maximum gradation values and converges on a medium value M; comparing the gradation value generated in the gradation value generating step with a pixel value; and providing the result of the comparing step to a thermal printer head To achieve the second object, there is provided a heating control apparatus of a thermal printer head, including a line memory for storing one-vertical-line data of image data constructed in a matrix form; an address generator for generating an address provided to the line memory; a gradation generator for generating a gradation value to be compared with a pixel value stored in the line memory; a comparator for comparing the pixel value read out from the line memory with the gradation value generated from the gradation generator; and a line buffer for storing by pixel the comparison result of the comparator and providing the stored result to the thermal printer head, the heating control apparatus comprising; a dividing circuit for receiving and dividing a clock signal for generating gradation into two and outputting the divided-by-2 clock signal; a counter for counting the divided-by-2 clock signal generated from the dividing circuit; an inverter for receiving a count value generated from the counter and outputting a complement of the count value; and a multiplexer for selecting either the count value generated from the counter or the inverted count value generated from the inverter, according to the divided-by-2 clock signal generated from the dividing circuit, and providing the selected value to the comparator.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 4:
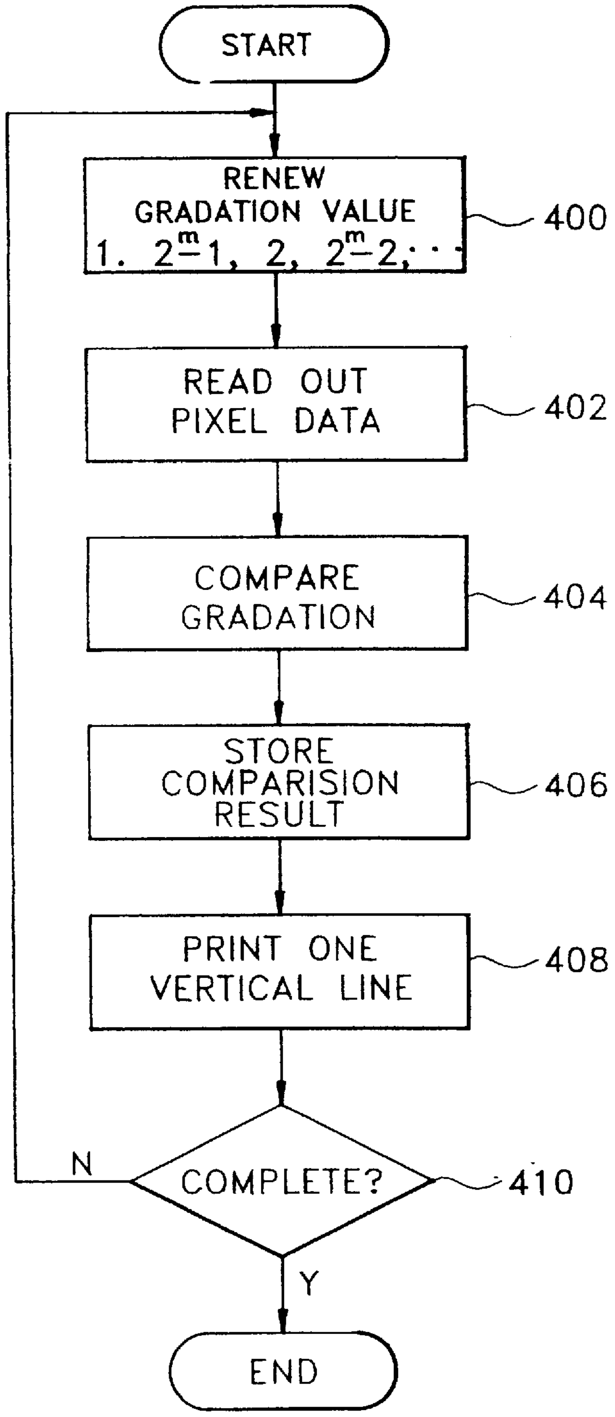
FIG. 4 is a flowchart for explaining an embodiment of a heating method according to the present invention.

FIG. 4 shows a flowchart for explaining a heating method according to an embodiment of the present invention.

First, in step 400, a gradation value generated from a gradation generator is renewed. Here, unlike the heating method described in FIG. 2, the gradation value varies in an order of 1, $2^m-1$, 2, $2^m-2$, . . . , M−1, M between the minimum gradation value and the maximum gradation value. That is, the value converges on a medium value "M" oscillating between the minimum gradation value 1 and the maximum gradation value $2^m-1$.

In step 402, the pixel data stored in a line memory is read out from the uppermost pixel down to the lowermost pixel.

In step 404, the gradation value generated from the gradation generator is compared with the read-out pixel value through a comparator.

In step 406, the comparison result of step 404 is stored in a line buffer.

In step 408, after all the pixel data of the line memory is read out and the gradation comparison completed, an address generator sends a gradation shift strobe signal to the gradation generator. TPH is then heated according to the comparison result stored in the line buffer.

In step 410, it is judged whether all the gradation values have been generated in the gradation generator. If all the gradation values are not generated, the operation returns to step 400. The completion of generating gradation values in the gradation generator means that printing for one vertical line is completed.

Figure 5:
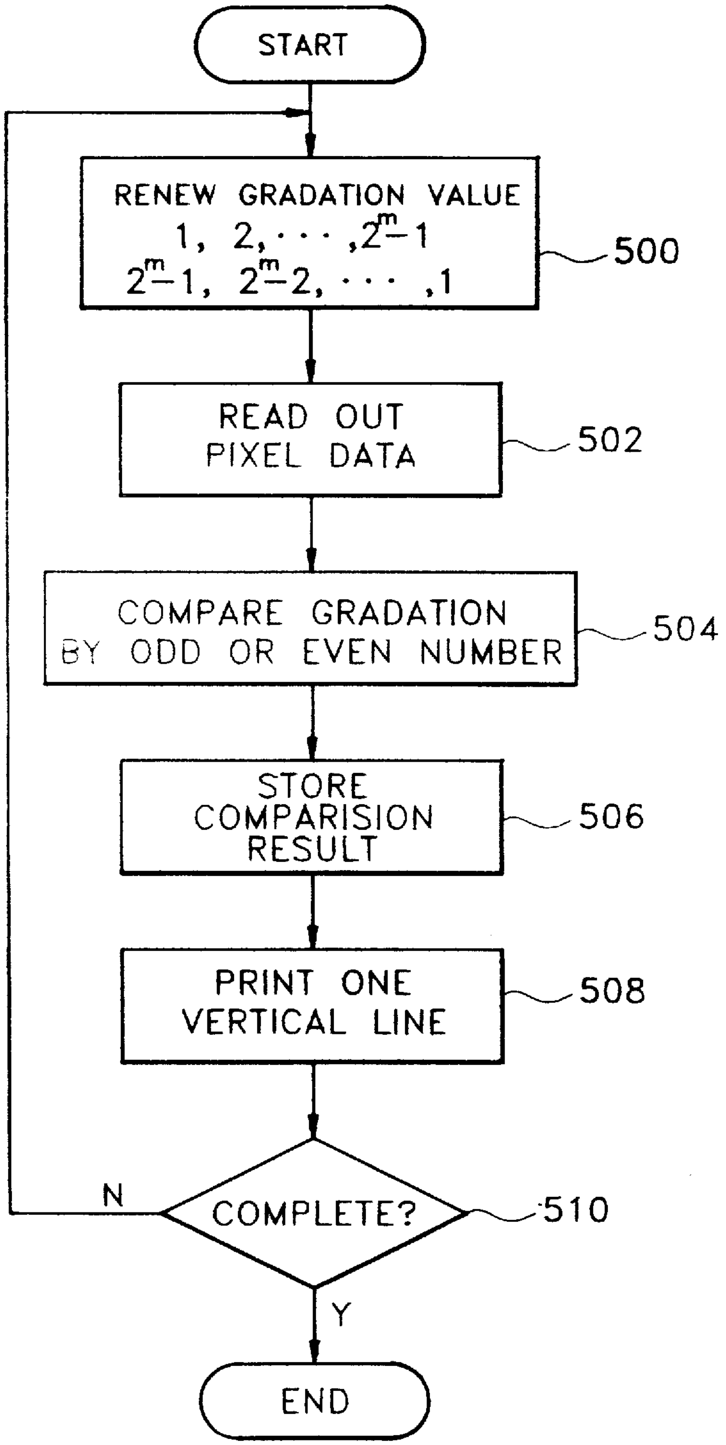
FIG. 5 is a flowchart for explaining another embodiment of the heating method according to the present invention.

FIG. 5 shows a flowchart for explaining the heating method according to another embodiment of the present invention.

First, in step 500, a gradation value generated from a gradation generator is renewed. Here, unlike the heating method described in FIG. 4, a first gradation value successively increasing from the minimum gradation value up to the maximum gradation value and a second gradation value successively decreasing from the maximum gradation value down to the minimum gradation value are generated.

In step 502, the pixel data stored in a line memory is read out from the uppermost pixel down to the lowermost pixel.

In step 504, the gradation value generated from the gradation generator is compared with the read out pixel value through a comparator. Here, the first and second gradation values generated in step 500 are compared with odd-numbered and even-numbered pixel values, respectively.

In step 506, the comparison result of step 504 is stored in a line buffer.

In step 508, after all the pixel data of the line memory is read out and the gradation comparison completed, an address generator sends a gradation shift strobe signal to the gradation generator. TPH is then heated according to the comparison result stored in the line buffer.

Here, the comparison result of the first gradation value and the odd-numbered pixel value is provided to an odd-numbered heating element of TPH, and the comparison result of the second gradation value and the even-numbered pixel value is provided to an even-numbered heating element of TPH.

In step 510, it is judged all the gradation values have been generated in the gradation generator. If all the gradation values are not generated, the operation returns to step 500. The completion of generating all the gradation values in the gradation generator means that printing for one vertical line is completed.

Figure 6:
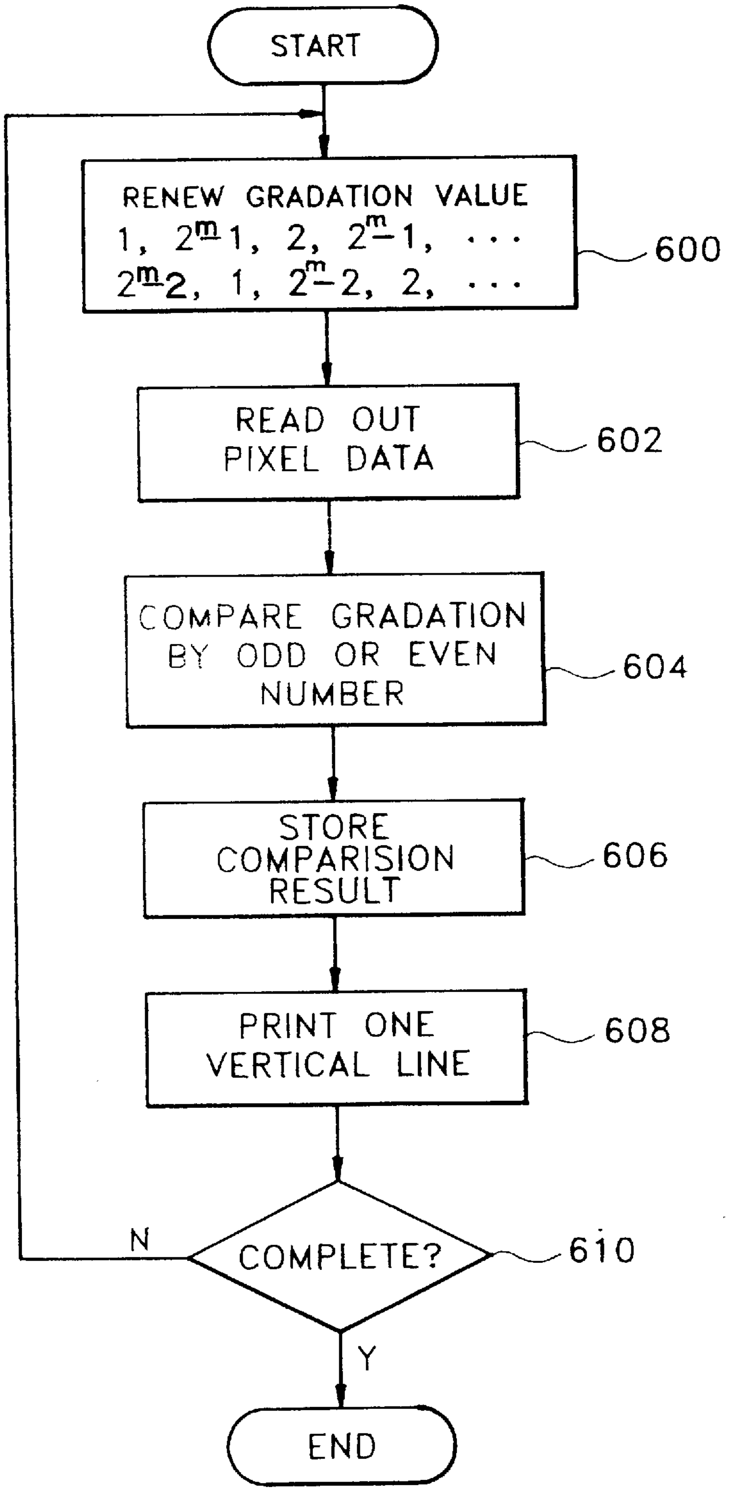
FIG. 6 is a flowchart for explaining yet another embodiment of the heating method according to the present invention.

FIG. 6 shows a flowchart for explaining the heating method according to yet another embodiment of the present invention.

First, in step 600, a gradation value generated from a gradation generator is renewed. Here, two gradation values are generated as in the heating method described in FIG. 5.

However, a first gradation value successively increases from the minimum gradation value up to the maximum gradation value, while varying in an order of 1, $2^m-1$, 2, $2^m-2$, . . . , M−1, M between the minimum and maximum gradation values. That is, the value converges on a medium value "M" oscillating between the minimum gradation value 1 and the maximum gradation value $2^m-1$.

In the meantime, a second gradation value successively decreases from the maximum gradation value down to the minimum gradation value, while varying in an order of $2^m-1$, 1, $2^m-2$, 2, . . . , M−1, M between the minimum and maximum gradation values. That is, the value converges on a medium value "M," oscillating between the minimum gradation value 1 and the maximum gradation value $2^m-1$.

In step 602, pixel data stored in a line memory is read out from the uppermost pixel down to the lowermost pixel.

In step 604, the gradation value generated from the gradation generator is compared with the read out pixel value through a comparator. Here, the first and second gradation values generated in step 600 are compared with odd-numbered and even-numbered pixel values, respectively.

In step 606, the comparison result of step 604 is stored in a line buffer.

In step 608, after all the pixel data of the line memory is read out and the gradation comparison completed, an address generator sends a gradation shift strobe signal to the gradation generator. TPH is then heated according to the comparison result stored in the line buffer.

Here, the comparison result of the first gradation value and the odd-numbered pixel value is provided to an odd-numbered heating element of TPH, and the comparison result of the second gradation value and the even-numbered pixel value is provided to an even-numbered heating element of TPH.

In step 610, it is judged whether the gradation values have been generated in the gradation generator. If all the gradation values are not generated, the operation returns to step 600. The completion of generating all the gradation values in the gradation generator means that printing for one vertical line is completed.

FIGS. 7A through 7D show distribution of heat according to the present invention.

Figure 7A:
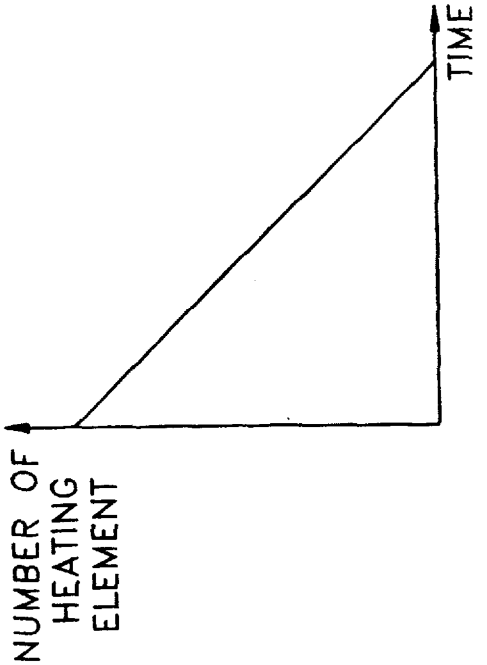
FIGS. 7A–7D are views showing the effects of the heating methods described in FIGS. 4 and 5.
Figure 7B:
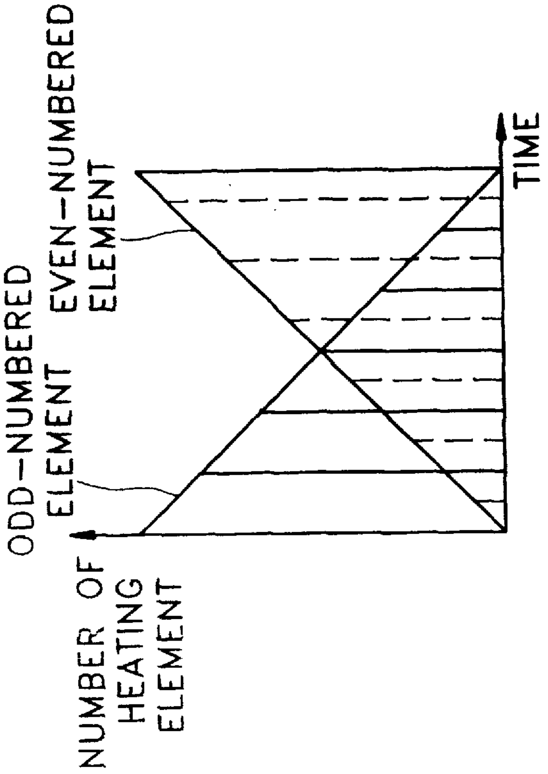

In FIG. 7A and 7B, the number of pixels constituting a vertical line is 256 and gradation falls under a range of 0 through 256, assuming that each pixel has a different pixel value.

When the gradation value is changed according to the method described in FIG. 2, density of the heating element of TPH varying according to time in each step is as follows.

Gradation value: 1→2→3→4→ . . .

Number of heating elements: 255→254→253→252→ . . .

FIG. 7A schematically shows the above correlation.

When the gradation value is changed according to the method described in FIG. 4, density of the heating element of TPH varying according to time in each step is as follows.

Gradation value: 1→255→2→254→ . . .

Number of heating elements: 255→0→254→1→ . . .

FIG. 7B schematically shows the above correlation. It is noted that the heat is more uniformly distributed over time, relative to that of FIG. 7A.

Figure 2:
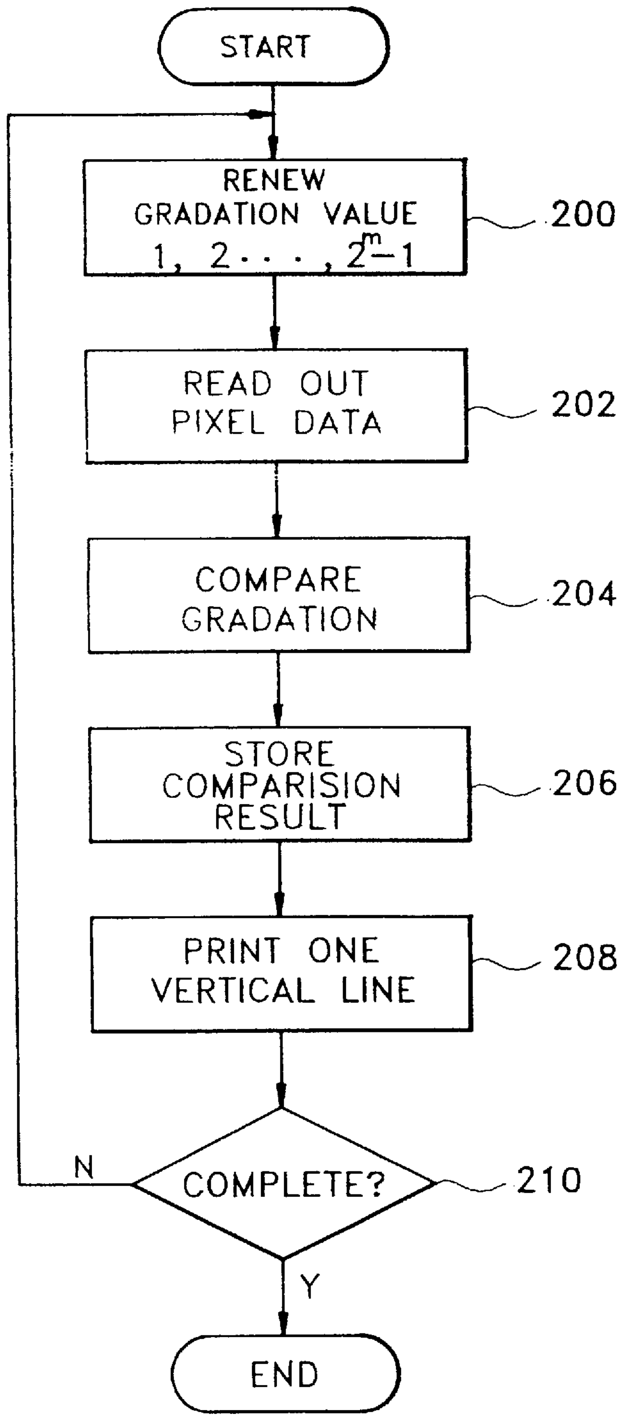
FIG. 2 (PRIOR ART)
FIG. 2 is a flowchart for explaining a conventional heating method.
Figure 3B:
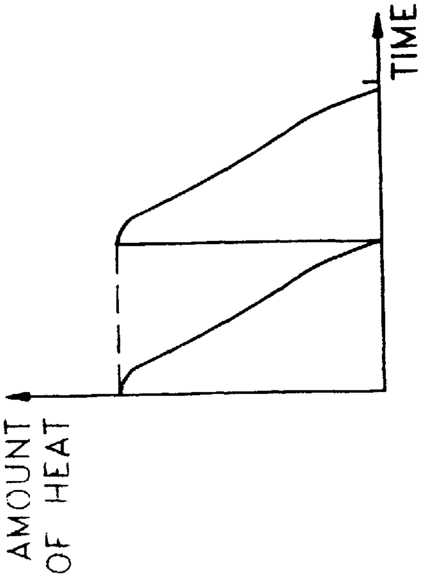
FIG. 3B (PRIOR ART)
FIGS. 3A–3B are views showing a heating distribution of TPH according to the conventional heating method.
Figure 3A:
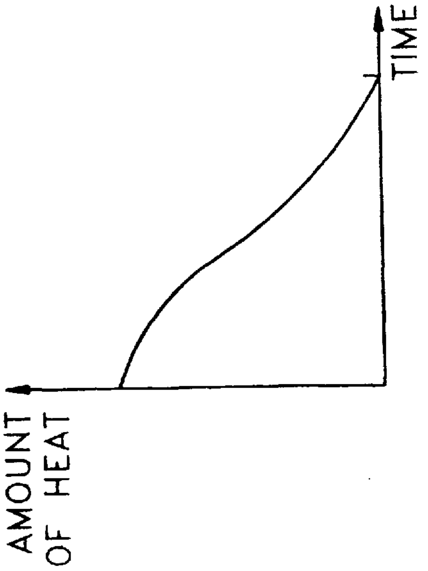
FIG. 3A (PRIOR ART)
Figure 7C:
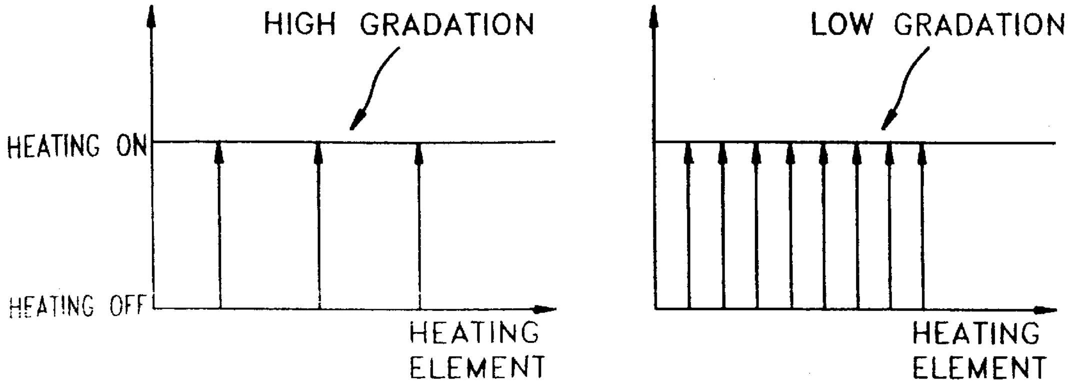

FIG. 7C shows a distribution of the heating elements in case of a high gradation and a low gradation according to the method described in FIG. 2. It is noted that the number of the heating elements in the high gradation is a few, but the number of the low gradation is numerous.

Figure 7D:
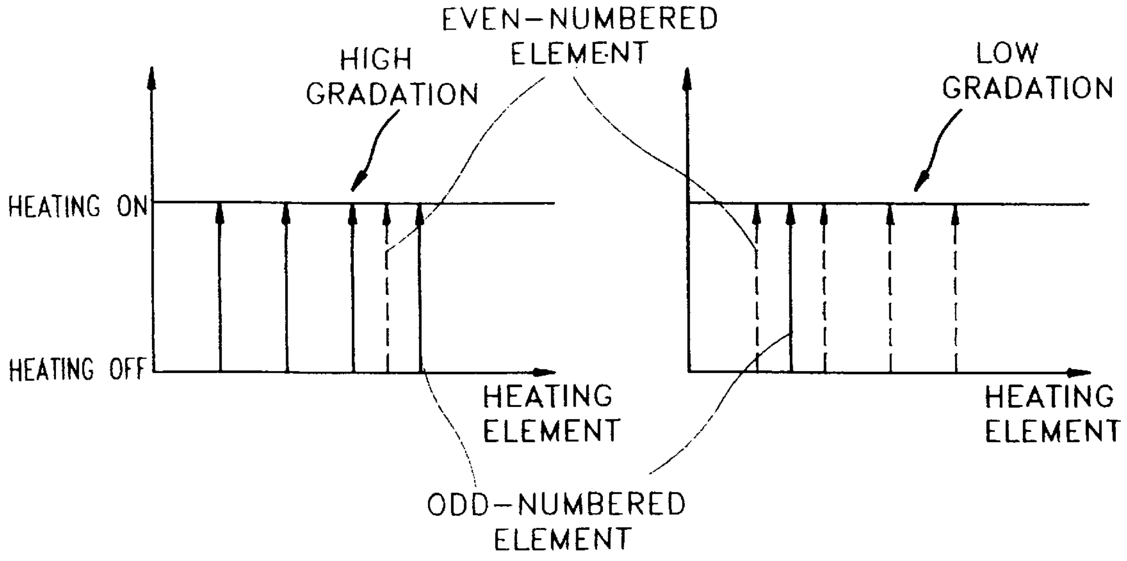

FIG. 7D shows a distribution of the heating elements in case of a high gradation and a low gradation according to the method described in FIG. 5. It is noted that the density of the heating elements in the low gradation is improved compared with FIG. 7C.

Figure 8A:
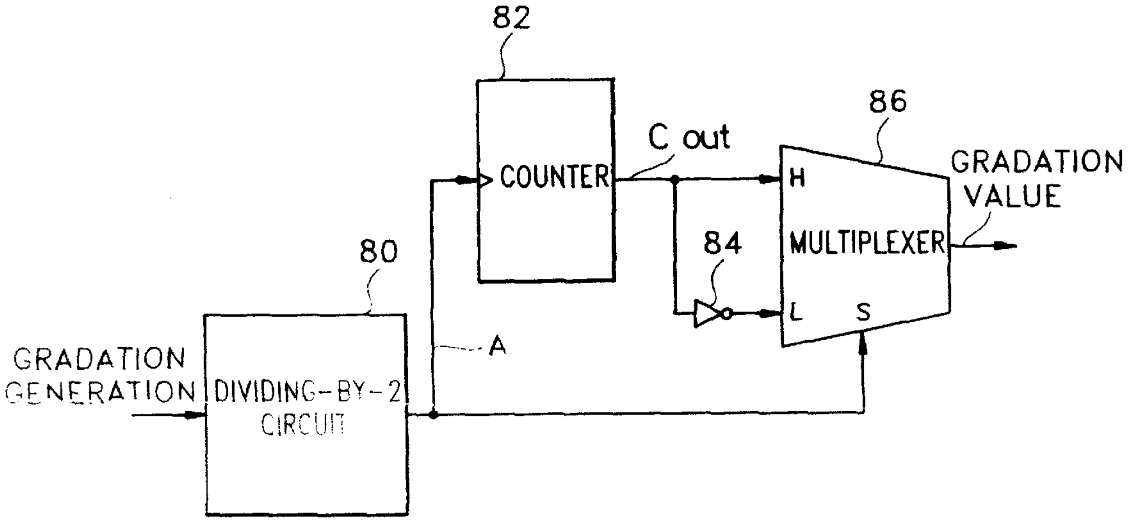
FIGS. 8A and 8B are a block diagram of the first embodiment of the gradation generator and a timing diagram corresponding to its operation according to the present invention, respectively.
Figure 8B:
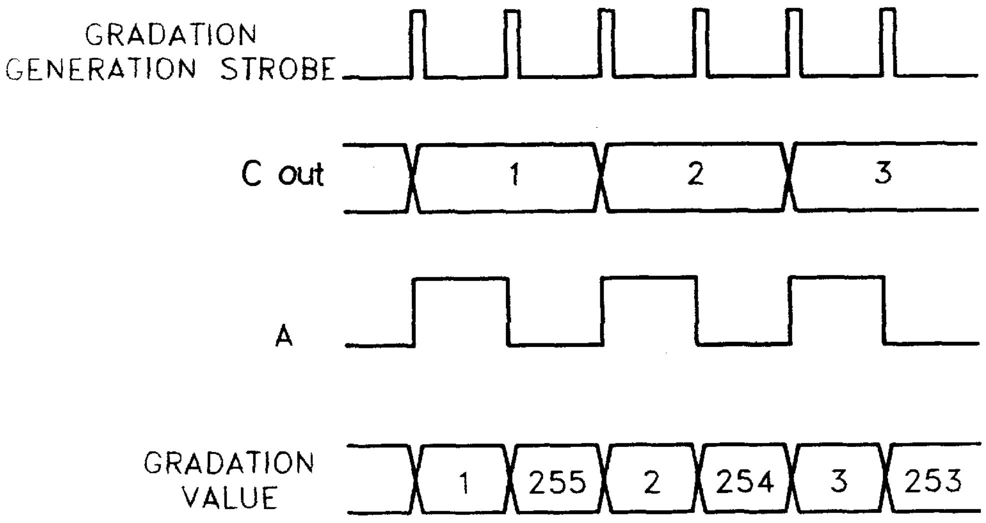

FIG. 8A is a block diagram illustrating a preferred embodiment of a gradation generator 14A befitting to the heating method of the present invention shown in FIG. 4. FIG. 8B shows each waveform of the portions shown in FIG. 8A. In FIG. 8A, a reference numeral 80 denotes a dividing circuit; a reference numeral 82 denotes a counter; a reference numeral 84 denotes an inverter; and a reference numeral 86 denotes a multiplexer.

Dividing circuit 80 is for receiving a gradation generator clock signal and generating a clock signal divided into two. The divided-by-2 clock signal is provided to both a clock input port of counter 82 and a selection input port of multiplexer 86.

Counter 82 is for receiving the divided-by-2 clock signal and generating a successively increasing count value. The count value generated from counter 82 is provided to both a first input port of multiplexer 86 and inverter 84.

Inverter 84 is for inverting the count value generated from counter 82 and providing the inverted count value to a second input port of multiplexer 86. The count value generated from counter 82 is parallel data, and the value output from inverter 84 becomes a complementary value since each bit is inverted by inverter 84. That is, when the count value is composed of 8 bits, the output values of inputs of "1" and "2" are "255" and "254," respectively.

Multiplexer 86 is for selectively outputting the count value input, according to the divided-by-2 clock signal, to the first input port or the inverted count value input to the second input port. As a result, the count values are output to multiplexer 86 in the order of 1, 255, 2, 254, . . . .

Figure 9A:
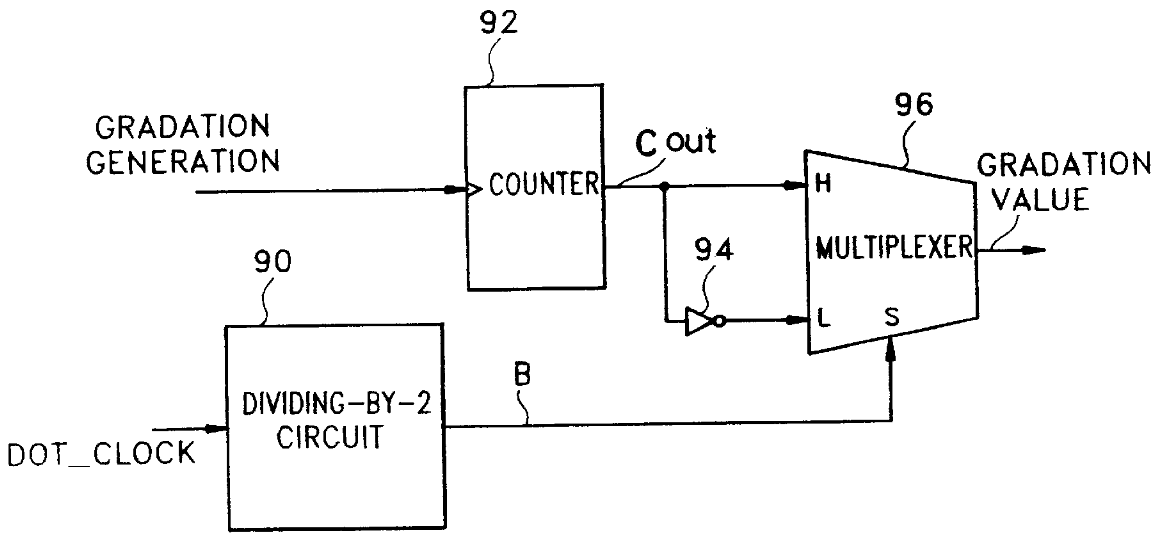
FIGS. 9A and 9B are a block diagram of the second embodiment of the gradation generator and a timing diagram corresponding to its operation according to the present invention, respectively.
Figure 9B:
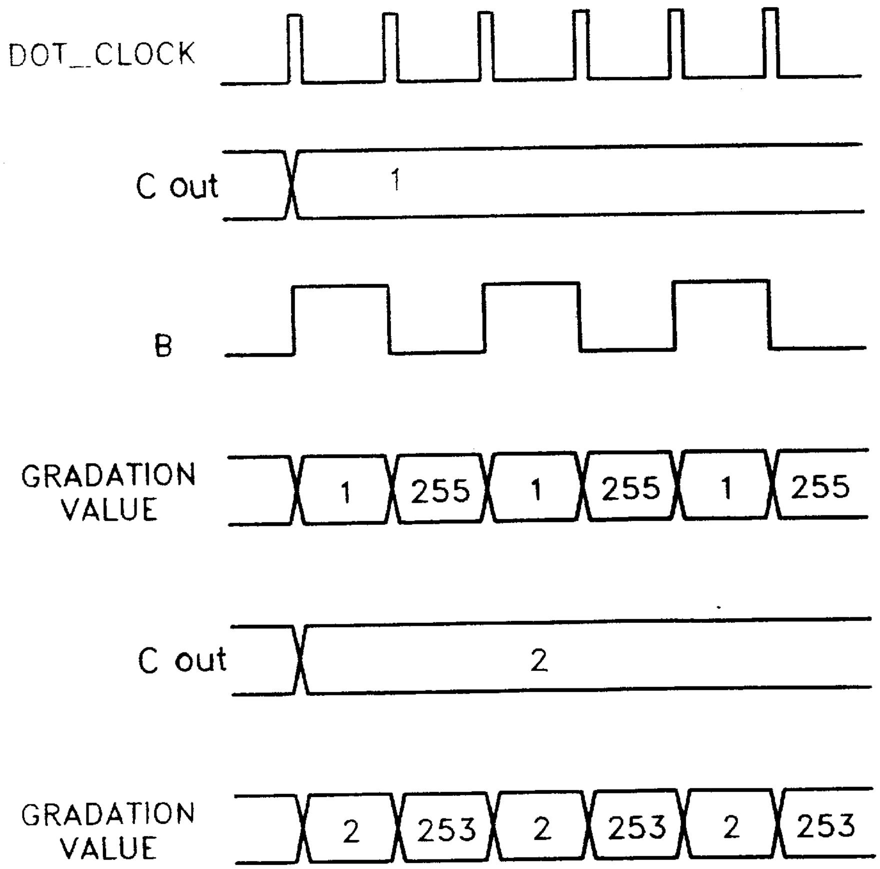

FIG. 9A is a block diagram illustrating a preferred embodiment of a gradation generator 15A befitting to the heating method of the present invention shown in FIG. 5. FIG. 9B shows a waveform of each portion shown in FIG. 9A.

In FIG. 9A, a reference numeral 90 denotes a dividing circuit; a reference numeral 92 denotes a counter; a reference numeral 94 denotes an inverter; and a reference numeral 96 denotes a multiplexer.

Dividing circuit 90 is for receiving a gradation generation clock signal and generating a clock signal divided into two. The divided-by-2 clock signal is provided to a selection input port of multiplexer 96.

Figure 1:
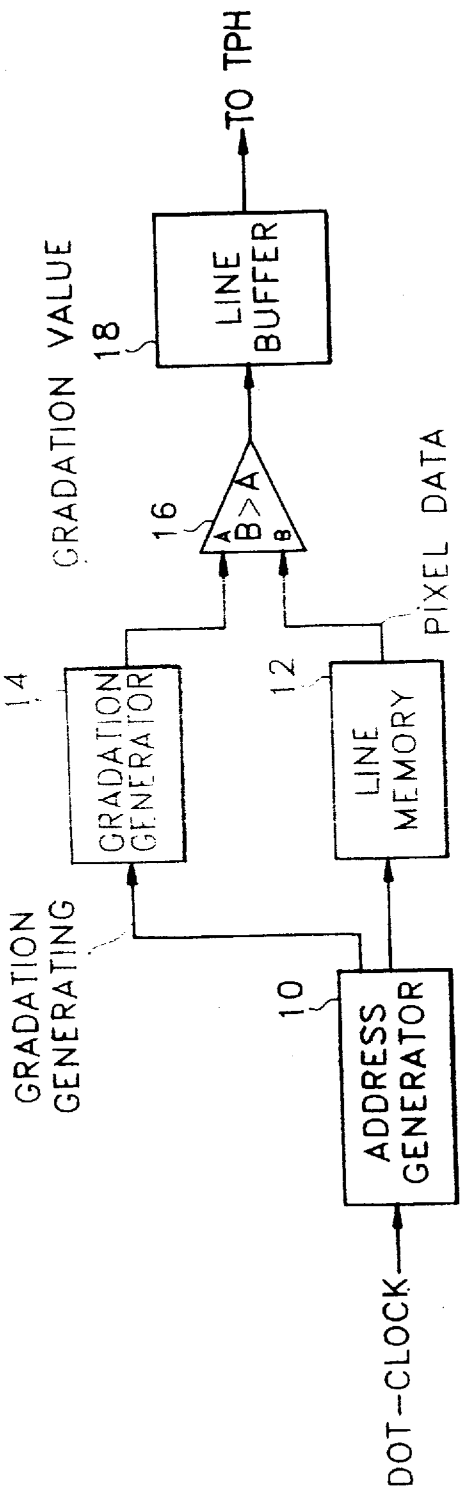
FIG. 1 (PRIOR ART)
FIG. 1 is a block diagram illustrating a conventional heating control apparatus.

Counter 92 is for receiving a gradation generation strobe signal for updating the gradation generation occurring in the address generator of FIG. 1 and generating a successively increasing count value. The count value generated from counter 92 is provided to both a first input port of multiplexer 96 and inverter 94.

Inverter 94 is for inverting the count value generated from counter 92 and providing the inverted count value to a second input port of multiplexer 96.

Multiplexer 96 is for selectively outputting, according to the divided-by-2 clock signal, the count value input to the first input port or the inverted count value input to the second input port.

As described above, in the heating method according to the present invention, the heat accumulation phenomenon is reduced by uniformly distributing the heat amount of TPH over the temporal and spatial axes, thus improving the TPH function.

Further, lowering of the TPH driving voltage can be prevented by reducing the density of the heating elements of TPH in the low gradation. Therefore, the deterioration of TPH function can be prevented.

What is claimed is:

1. A heating method of a thermal print head controlled by a heating control apparatus which includes a line memory for storing one-vertical-line of image data constructed in a matrix form; an address generator for generating an address which is provided to the line memory; a graduation generator for generating a graduation value to be compared with a pixel value stored in the line memory; a comparator for comparing the pixel value read out from the line memory with the gradation value generated from the gradation generator; and a line buffer for storing by pixel the comparison result of the comparator, said heating method comprising the steps of:

generating successive gradation values which oscillate between minimum and the maximum gradation values and converge on a medium value M;

successively comparing the gradation values generated in said gradation value generating step with successive pixel values; and providing the result of said comparing step to said thermal printer head.

2. A heating method of a thermal printer head controlled by a heating control apparatus which includes a line memory for storing one-vertical-line data of image data constructed in a matrix form; an address generator for generating an address provided to the line memory; a gradation generator for generating a gradation value to be compared with a pixel value stored in the line memory; a comparator for comparing the pixel value read out from the line memory with the gradation value generated from the gradation generator; and a line buffer for storing by pixel the comparison result of the comparator and providing the stored result to the thermal printer head having a plurality of numbered heating elements, said heating method comprising the steps of:

generating a first set of gradation values successively increasing from a minimum gradation value up to a maximum gradation value, and a second set of gradation values successively decreasing from the maximum gradation value down to the minimum gradation value;

successively comparing the gradation values from said first set generated in said gradation value generation step with odd-numbered pixel data from said line memory;

successively comparing the gradation values from said second set generated in said gradation value generation step with even-numbered pixel data from said line memory; and providing the comparison results of said first set to odd-numbered heating elements, and the comparison results of said second set to even-numbered heating elements of said thermal printer head.

3. A heating method of a thermal printer head controlled by a heating control apparatus which includes a line memory for storing one-vertical-line data of image data constructed in a matrix form; an address generator for generating an address provided to the line memory: a gradation generator for generating a gradation value to be compared with a pixel value stored in the line memory; a comparator for comparing the pixel value read out from the line memory with the gradation value generated from the gradation generator; and a line buffer for storing by pixel the comparison result of the comparator and providing the stored result to the thermal printer head having a plurality of heating elements, said heating method comprises the steps of:

generating a first set of gradation values which oscillate between minimum and maximum gradation values and converge on a medium gradation value; and generating a second set of gradation values which oscillate between said maximum and said minimum gradation values and converge on the medium gradation value.

4. A heating control apparatus of a thermal printer head, including a line memory for storing one-vertical-line data of image data constructed in a matrix form; an address generator for generating an address provided to the line memory; a gradation generator for generating a gradation value to be compared with a pixel value stored in the line memory; a comparator for comparing the pixel value read out from the line memory with the gradation value generated from the gradation generator; and a line buffer for storing by pixel the comparison result of the comparator and providing the stored result to the thermal printer head having a plurality of heating elements, said heating control apparatus comprising;

a dividing circuit for receiving and dividing a clock signal for outputting a divided-by-2 clock signal;

a counter for counting the divided-by-2 clock signal generated from said dividing circuit;

an inverter for receiving a count value generated from said counter and outputting a complement of the count value; and a multiplexer for selecting one of the count value generated from said counter and the inverted count value generated from said inverter, according to the divided-by-2 clock signal generated from said dividing circuit, and providing the selected value to said comparator.

5. A heating control apparatus of a thermal printer head, including a line memory for storing one-vertical-line data of image data constructed in a matrix form; an address generator for generating an address provided to the line memory and a gradation generation strobe signal requiring renewal of a gradation value; a gradation generator for generating the gradation value to be compared with the pixel value stored in the line memory in accordance with the gradation generation strobe signal generated from the address generator; a comparator for comparing the pixel value read out from the line memory with the gradation value generated from the gradation generator; and a line buffer for storing by pixel the comparison result of the comparator and providing the stored result to the thermal printer head having a plurality of heating elements, said heating control apparatus comprising;

a dividing circuit for receiving and dividing a clock signal for outputting a divided-by-2 clock signal;

a counter for counting the gradation generation strobe signal generated from said address generator;

an inverter for receiving a count value generated from said counter and outputting a complement of the received count value; and a multiplexer for selecting one of the count value generated from said counter and the inverted counting value generated from said inverter, according to the divided-by-2 clock signal generated from said dividing circuit, and providing the selected value to said comparator.

6. A heating control apparatus which includes a line memory for storing pixel values of image data, comprising:

a gradation generator for generating successive gradation values which oscillate between minimum and maximum gradation values and converge on a medium value M;

a comparator for comparing successive pixel values read out from the line memory with the successive gradation values generated by the gradation generator; and a line buffer for storing the comparison result of the comparator and providing the stored result to a thermal printer head.

7. A heating control apparatus which includes a line memory for storing pixel values of image data, comprising:

a gradation generator for generating a first set of successive gradation values which increase from a minimum gradation value to a maximum gradation value, and a second set of successive gradation values which decrease from the maximum gradation value to the minimum gradation value;

a comparator for comparing successive odd-numbered pixel values read out from the line memory with the successive gradation values of the first set, and comparing successive even-numbered pixel values read out from the line memory with the successive gradation values of the second set.

8. The heating control apparatus of claim 7, further comprising:

a line buffer for providing the results of the comparison of the pixel values from the first set to odd-numbered heating elements of said thermal printing head, and providing the results of the comparison of the pixel values from the second set to even-numbered heating elements of said thermal printing head.

9. A heating control apparatus which includes a line memory for storing pixel values of image data, comprising:

a gradation generator for generating a first set of successive gradation values which oscillate between a minimum gradation value and a maximum gradation value and converge on a medium value M, and a second set of successive gradation values which oscillate between the maximum gradation value and the minimum gradation value and converge on the medium value M;

a comparator for comparing successive odd-numbered pixel values read out from the line memory with the successive gradation values of the first set, and comparing successive even-numbered pixel values read out from the line memory with the successive gradation values of the second set.

10. The heating control apparatus of claim 9, further comprising:

a line buffer for providing the results of the comparison of the pixel values from the first set to odd-numbered heating elements of a thermal printing head, and providing the results of the comparison of the pixel values from the second set to even-numbered heating elements of said thermal printing head.

11. A gradation generator circuit responsive to clock signals to generate successive gradation values which oscillate between a minimum and maximum gradation value and converge to a median value M, said circuit comprising:

a counter receiving said clock signals and providing first count signals and second count signals complementary to said first count signals; and a multiplexer receiving said clock signals, said first count signals and said second count signals, said multiplexer being responsive to said clock signals to alternately select count signals from said first and second count signals.

12. A gradation generator circuit responsive to clock signals to generate successive gradation values which oscillate between a minimum and maximum gradation value and converge to a median value M, said circuit comprising:

a divider receiving said clock signals and providing divided clock signals;

a counter coupled to said divider and receiving said divided clock signals to provide first count signals and second count signals complementary to said first count signals; and a multiplexer receiving said divided clock signals, said first count signals and said second count signals, said multiplexer being responsive to said divided clock signals to alternately select a count signal from one of said first and second count signals.

13. A gradation generator circuit receiving a first clock signal and a second clock signal, and outputting a gradation value, comprising:

a dividing circuit receiving said first clock signal and outputting a divided clock signal;

a counter receiving said second clock signal and outputting a count signal and a complementary count signal; and a multiplexer receiving said divided clock signal, said count signal and said complementary count signal, and being responsive to said divided clock signal to output a gradation value from said count signal and complementary count signal.

14. A gradation generator circuit of claim 13, wherein said gradation generator circuit outputs a first set of gradation values successively increasing from a minimum gradation value up to a maximum gradation value, and a second set of gradation values successively decreasing from the maximum gradation value down to the minimum gradation value.

15. A gradation generator circuit of claim 13, wherein said gradation generator circuit outputs a first set of gradation values successively increasing from a first minimum gradation value up to a first maximum gradation value, and a second set of gradation values successively decreasing from a second maximum gradation value down to a second minimum gradation value.

16. A heating control apparatus as claimed in claim 15, wherein the first minimum gradation value and the second minimum gradation value are equal minimum gradation values and the first maximum gradation value and the second maximum gradation value are equal maximum gradation values.

17. A heating control apparatus which includes a line memory for storing pixel values of image data, comprising:

a gradation generator for generating a first set of successive gradation values which oscillate between a first minimum gradation value and a first maximum gradation value and converge on a medium value M, and a second set of successive gradation values which oscillate between a second maximum gradation value and a second minimum gradation value and converge on the medium value M;

a comparator for comparing successive odd-numbered pixel values read out from the line memory with the successive gradation values of the first set, and comparing successive even-numbered pixel values read out from the line memory with the successive gradation values of the second set.

18. A heating control apparatus as claimed in claim 17, wherein the first minimum gradation value and the second minimum gradation value are equal minimum gradation values and the first maximum gradation value and the second maximum gradation value are equal maximum gradation values.

* * * * *